United States Patent

Sano et al.

Patent Number: 5,599,386
Date of Patent: Feb. 4, 1997

[54] RECORDING LIQUID

[75] Inventors: Hideo Sano; Yukichi Murata; Hiroshi Takimoto, all of Yokohama, Japan

[73] Assignee: Mitsubishi Chemical Corporation, Tokyo, Japan

[21] Appl. No.: 445,797

[22] Filed: May 4, 1995

[30] Foreign Application Priority Data

May 12, 1994 [JP] Japan ..... 6-098756
Jul. 1, 1994 [JP] Japan ..... 6-151162

[51] Int. Cl.⁶ ..... C09D 11/02
[52] U.S. Cl. ..... 106/22 R; 106/20 D
[58] Field of Search ..... 106/22 K, 20 D; 534/799, 802

[56] References Cited

U.S. PATENT DOCUMENTS

| | | | |
|---|---|---|---|
| 1,667,312 | 4/1928 | Fritzsche et al. | 106/22 K |
| 4,631,085 | 12/1986 | Kawanishi et al. | 106/22 K |
| 5,074,914 | 12/1991 | Shirota et al. | 106/22 K |
| 5,118,737 | 6/1992 | Baxter et al. | 106/22 K |
| 5,135,571 | 8/1992 | Shirota et al. | 106/22 K |
| 5,429,671 | 7/1995 | Yamamoto | 106/22 K |
| 5,476,541 | 12/1995 | Tochihara | 106/22 K |

FOREIGN PATENT DOCUMENTS

| | | |
|---|---|---|
| 0194885A1 | 9/1986 | European Pat. Off. . |
| 2535333 | 4/1984 | France . |
| 61-62562 | 3/1986 | Japan . |
| 61-195176 | 5/1986 | Japan . |
| 61-101574 | 8/1986 | Japan . |
| 61-247770 | 11/1986 | Japan . |
| 62-156168 | 7/1987 | Japan . |
| 63-63765 | 3/1988 | Japan . |
| 4-279671 | 10/1992 | Japan . |
| 2131825 | 6/1984 | United Kingdom . |
| 2171714 | 9/1986 | United Kingdom . |

OTHER PUBLICATIONS

K. Miura et al., *Chemical Abstracts*, 106(4):66, abstract No. 19955u (1987), no month available.

*Primary Examiner*—Helene Klemanski
*Attorney, Agent, or Firm*—David G. Conlin; Peter F. Corless

[57] ABSTRACT

A recording liquid comprising an aqueous medium and at least one selected from the compounds whose free acid form is represented by the formula {1}:

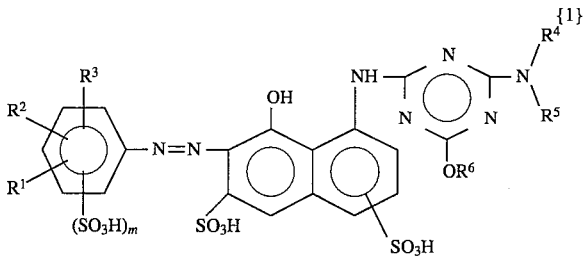

wherein, $R^1$, $R^2$ and $R^3$ each independently represent a substituted or unsubstituted $C_{1-9}$ alkyl group, a $C_{1-9}$ alkoxy group, a halogen, hydrogen, a hydroxyl group, a substituted or unsubstituted carbamoyl group, a substituted or unsubstituted sulfamoyl group, a substituted or unsubstituted amino group, a nitro group, a sulfonic ester group, a $C_{1-9}$ alkyl- or $C_{6-15}$ aryl-sulfonyl group, a COOH group or a carboxylic ester group;

m is a number of 0, 1 or 2; and $R^4$, $R^5$ and $R^6$ each independently represent hydrogen, a $C_{1-18}$ alkyl group, a $C_{2-18}$ alkenyl group, an aryl group, an aralkyl group, an alicyclic group or a heterocyclic group, any of which groups except hydrogen may have a substituent.

21 Claims, No Drawings

RECORDING LIQUID

BACKGROUND OF THE INVENTION

The present invention relates to a recording liquid and, in particular, to a recording liquid suited for use in ink-jet recording.

The ink-jet recording system in which recording is performed by ejecting droplets of a recording liquid containing a water-soluble dye such as direct dye or acid dye from fine discharging orifices is now in practical use.

Recording liquids used in the ink-jet recording system are required to fix fast on recording paper of common office use such as PPC (plain paper copy) paper for electrophotography and fanfold paper (continuous paper for computers), to form high-quality images, in other words, to form clear-cut outlines of ink dots without blotting, and to have excellent storage stability, so the solvents usable for this kind of recording liquid are very limited.

Regarding dyes used for the recording liquid, on the other hand, the dyes are required to have sufficient solubility in the limited usable solvents, to remain stable even when it is stored for a long time in the recording liquid, to provide a high density of recorded image and to have excellent water and light resistance. However, it has been difficult to obtain a dye which can meet all of these requirements.

In an effort for satisfying above requirements, many proposals have been made (Japanese Patent Application Laid-Open (KOKAI) Nos. 61-101574, 61-101576, 61-195176, 61-62562, 61-247771, 62-156168 (USP 4,771, 129), 63-63765, 63-295685, 1-123866, 2-16171, 3-122171, 3-203970, 4-15327, 4-279671, etc.). Nevertheless, none of them has yet reached a level which satisfactorily meets to the requirements.

The present inventors have found that when a specific compound as a dye for a recording liquid, there can be obtained a magenta recording liquid which, even when used for ink-jet recording or for recording with ordinary writing instruments on plain paper, is capable of forming a recorded image with high quality, high density and excellent color tone, and which also has excellent water and light resistance and is stable when stored for a long time. The present invention has been attained on the basis of this finding.

SUMMARY OF THE INVENTION

In a first aspect of the present invention, there is provided a recording liquid comprising an aqueous medium and at least one selected from the compounds whose free acid form is represented by the formula {1}:

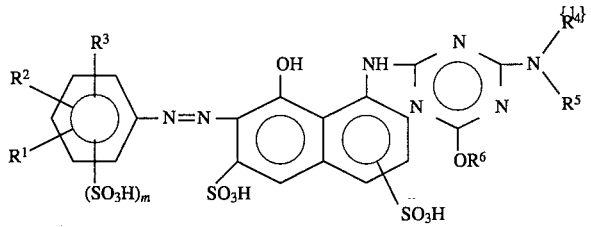

wherein, $R^1$, $R^2$ and $R^3$ each independently represent a substituted or unsubstituted $C_{1-9}$ alkyl group, a $C_{1-9}$ alkoxy group, a halogen, hydrogen, a hydroxyl group, a substituted or unsubstituted carbamoyl group, a substituted or unsubstituted sulfamoyl group, a substituted or unsubstituted amino group, a nitro group, a sulfonic ester group, a $C_{1-9}$ alkyl- or $C_{6-15}$ aryl-sulfonyl group, a COOH group or a carboxylic ester group;

m is a number of 0, 1 or 2; and $R^4$, $R^5$ and $R^6$ each independently represent hydrogen, a $C_{1-18}$ alkyl group, a $C_{2-18}$ alkenyl group, an aryl group, an aralkyl group, an alicyclic group or a heterocyclic group, any of which groups except hydrogen may have a substituent.

In a second aspect of the present invention, there is provided the compound whose free acid form is represented by the formula {1}.

DETAILED DESCRIPTION OF THE INVENTION

Substituents represented by $R^1$, $R^2$ and $R^3$ in the formula {1} each independently include the following (a) to (m):

(a) a substituted or unsubstituted $C_{1-9}$ alkyl group such as methyl, ethyl, n-propyl, isopropyl, n-butyl groups, and these groups substituted with a halogen or a substituted or unsubstituted amino group (usually, as mentioned at below (h)), for example, trifluoromethyl and dimethylaminomethyl groups.

(b) a $C_{1-9}$ alkoxy group such as methoxy, isopropoxy and n-butoxy groups.

(c) a halogen such as fluorine, chlorine and bromine.

(d) hydrogen.

(e) a hydroxyl group.

(f) a substituted or unsubstituted carbamoyl group such as a carbamoyl group, and a carbamoyl group substituted with a $C_{1-4}$ alkyl group or an aryl group, for example, N,N-dimethylcarbamoyl and phenylcarbamoyl groups.

(g) a substituted or unsubstituted sulfamoyl group such as a sulfamoyl group, and a sulfamoyl group substituted with a $C_{1-4}$ alkyl group or a substituted or unsubstituted aryl group (usually, as mentioned at below (q)), for example, N-methylsulfamoyl, N-ethylsulfamoyl, N-ethyl-N-phenylsulfamoyl, N,N-dimethylsulfamoyl and p-carboxyphenylsulfamoyl groups.

(h) a substituted or unsubstituted amino group such as an amino group, and an amino group substituted with a $C_{1-4}$ alkyl group, a carbamoyl group or an aryl group, for example, N-methylamino, carbamoylamino, N,N-diethylamino and acetylamino groups.

(i) a nitro group.

(j) a sulfonic ester group such as a sulfonic acid lower alkyl ester group (for example, methoxysulfonyl, propoxysulfonyl groups) and a sulfonic acid aryl ester group (for example, phenoxysulfonyl group).

(k) a substituted or unsubstituted $C_{1-9}$ alkyl- or $C_{6-15}$ aryl-sulfonyl group such as a methylsulfonyl group, a phenylsulfonyl group, and a $C_{1-9}$ alkyl- or $C_{6-15}$ aryl-sulfonyl group substituted with a hydroxy group or a phenyl group, for example, hydroxyethylsulfonyl and benzylsulfonyl groups.

(l) a COOH group. (m) a carboxylic ester group such as a carboxylic acid lower alkyl ester group (for example, methoxycarbonyl and propoxycarbonyl groups).

In the formula {1}, m represents a number of 0, 1 or 2.

In the present invention, it is preferable that m is 1 and the $SO_3H$ group substitutes at the ortho-positions with respect to the azo group.

It is also preferable in the present invention that m is 0 and at least one of $R^1$, $R^2$ and $R^3$ is hydrogen and also at least one of $R^1$, $R^2$ and $R^3$ is a group selected from a trifluoromethyl group, a substituted or unsubstituted carbamoyl group, a substituted or unsubstituted sulfamoyl group, a sulfonic acid lower alkyl ester group, a COOH group and a carboxylic acid lower alkyl ester group, at the ortho-position with respect to the azo group.

As to the substituted groups, examples thereof include the same substituents as mentioned at above (f) and (g).

The term "lower" used herein generally means $C_{1-4}$.

In the present invention, it is especially preferable that the group of the formula:

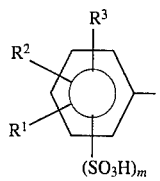

in the formula {1}, is a group represented by the formula:

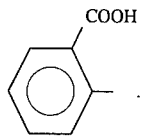

Substituents represented by $R^4$, $R^5$ and $R^6$ in the formula {1} each independently include the following (n) to (t):

(n) hydrogen.

(o) a substituted or unsubstituted $C_{1-18}$ alkyl group such as ethyl, n-butyl, n-octyl, ethylhexyl and hydroxyethyl groups, and an alkyl group having a carboxy group (for example, carboxypropyl, carboxycyclohexylmethyl, 1-carboxy-2-mercaptoethyl, 1-carboxy-2-carbamoylethyl, 1-isopropyl-1-carboxymethyl and 1,2-dicarboxypropyl groups).

(p) a substituted or unsubstituted $C_{2-18}$ alkenyl group such as 2-methyl-1-propenyl, vinyl and allyl groups.

(q) a substituted or unsubstituted aryl group such as a phenyl group, and a phenyl group substituted with a carboxy group or a $C_{1-6}$ alkyl group, for example, 3,4-dicarboxyphenyl, 4-butylphenyl and 4-carboxyphenyl groups.

(r) a substituted or unsubstituted aralkyl group such as a benzyl group, a phenethyl group, and these groups substituted with a carboxy group or a hydroxy group, for example, 1-carboxy-2-phenylethyl, 1-carboxy-2-hydroxyphenylethyl and 4-carboxybenzyl groups.

(s) a substituted or unsubstituted alicyclic group such as cyclohexyl and 4-carboxycyclohexyl groups.

(t) a substituted or unsubstituted heterocyclic group such as pyridyl, thiadiazolyl, benzothiazolyl and 2,2,6,6-tetramethylpiperidinyl groups.

The aralkyl group usually has 7 to 15 carbon atoms. The aryl group usually has 6 to 15 carbon atoms. The alicyclic group usually has 6 to 15 carbon atoms. The heterocyclic group usually has 5 to 12 atoms which form a heterocyclic ring. The hetero atom in the heterocyclic group is usually at least one selected from N, O and S.

It is especially advantageous that at least one of $R^4$, $R^5$ and $R^6$ is an alkyl group, an alkenyl group, an aryl group, an alicyclic group, an aralkyl group or a heterocyclic group, and these groups are substituted with 1 to 4 COOH groups. In an embodiment of the present invention, it is preferable that at least one of $R^4$, $R^5$ and $R^6$ is an alkyl group, an alkenyl group, an aryl group, an aralkyl group or a cyclohexyl group, and these groups are substituted with 1 to 4 COOH groups, more preferably one of $R^4$ and $R^5$ is hydrogen and the other is an alkyl group, an alkenyl group, an aryl group, an aralkyl group or a cyclohexyl group, and these groups are substituted with 1 to 4 COOH groups.

In another embodiment of the present invention, it is preferable that $R^4$ and $R^5$ each independently represent hydrogen or a group represented by the formula {2}:

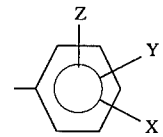

wherein X, Y and Z each independently represent hydrogen, a halogen, a hydroxyl group, a substituted or unsubstituted $C_{1-12}$ alkyl group, a $C_{1-9}$ alkoxy group, a substituted or unsubstituted carbamoyl group, a substituted or unsubstituted sulfamoyl group, a substituted or unsubstituted amino group, a nitro group, a sulfonic ester group or a carboxylic ester group. As to the substituted groups, examples of the substituted $C_{1-12}$ alkyl, carbamoyl, sulfamoyl or amino group include the same substituents as mentioned at above (a), (f), (g) and (h). Examples of the sulfonic or carboxylic ester group include the same substituents as mentioned at above (j) and (m).

In still another embodiment of the present invention, it is preferable that one of $R^4$ and $R^5$ is hydrogen and the other is a group represented by the formula {3}:

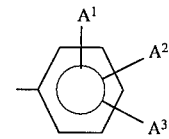

wherein $A^1$, $A^2$ and $A^3$ each independently represent hydrogen; a carboxyl group; a carbamoyl group or a sulfamoyl group, which may be substituted with a $C_{1-4}$ alkyl group; or a $C_{2-5}$ alkoxy carbamoyl group; with a proviso that all of $A^1$, $A^2$ and $A^3$ don't represent hydrogen at the same time. In this case, it is especially preferable that at least one of $A^1$, $A^2$ and $A^3$ is hydrogen, still more preferably, at least one of $A^1$, $A^2$ and $A^3$ is a carboxyl group.

In yet another embodiment of the present invention, it is preferable that one of $R^4$ and $R^5$ is hydrogen and the other is a group represented by the formula {4}:

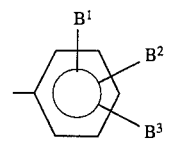

wherein $B^1$, $B^2$ and $B^3$ each independently represent hydrogen; a normalchain $C_{4-12}$ alkyl group; or an amino group, a carbamoyl group or a sulfamoyl group, which is mono- or di- substituted with a $C_{4-9}$ alkyl group; or a $C_{5-9}$ alkoxycarbamoyl group; with a proviso that all of $B^1$, $B^2$ and $B^3$ don't represent hydrogen at the same time. In this case, it is especially preferable that at least one of $B^1$, $B^2$ and $B^3$ is hydrogen, still more preferably, at least one of $B^1$, $B^2$ and $B^3$ is a normal-chain $C_{4-9}$ alkyl group.

In the present invention, $R^6$ is preferably hydrogen.

It is more preferable that the $SO_3H$ groups substitute at the 3- and 5-positions or at the 3- and 6-positions of the naphthol ring in the formula {1}, especially, the $SO_3H$ groups substitute at the 3- and 6-positions of the naphthol ring.

It is especially preferred that the compound used in the present invention has in its structure not more than 6, preferably not more than 5, more preferably not more than 4 of SO₃H and COOH groups and salt and lower alkyl ester groups thereof, in total.

In the present invention, the compound may be used in the form of free acid shown by the formula {1}, but when it is obtained as a salt at the time of production, it may be used either in the form as it is or after converted to a desired salt. Part of acid groups in the compound may be replaced by a salt group, or both salt group and free acid group may exist in combination. Examples of the salt group are salts of alkali metals such as Na, Li and K, salts of ammonium which may be substituted with an alkyl or hydroxyalkyl group (usually lower alkyl or hydroxyalkyl), and salts of organic amines such as lower alkylamines, hydroxy-substituted lower alkylamines, carboxy-substituted lower alkylamines and polyamines having 2 to 10 alkyleneimine units with 2 to 4 carbon atoms. The ammonium may be primary, secondary, tertiary or quaternary. The compound in the form of a salt may have either a single kind of the salt groups or two or more of them in combination.

In the structure of the compound used in the present invention, when a plural number of acid groups are contained in the molecule, such plural acid groups may be in either salt form or free acid form and may be different from each other.

Examples of the above-specified compounds are Compounds No. 1 to 55 shown below.

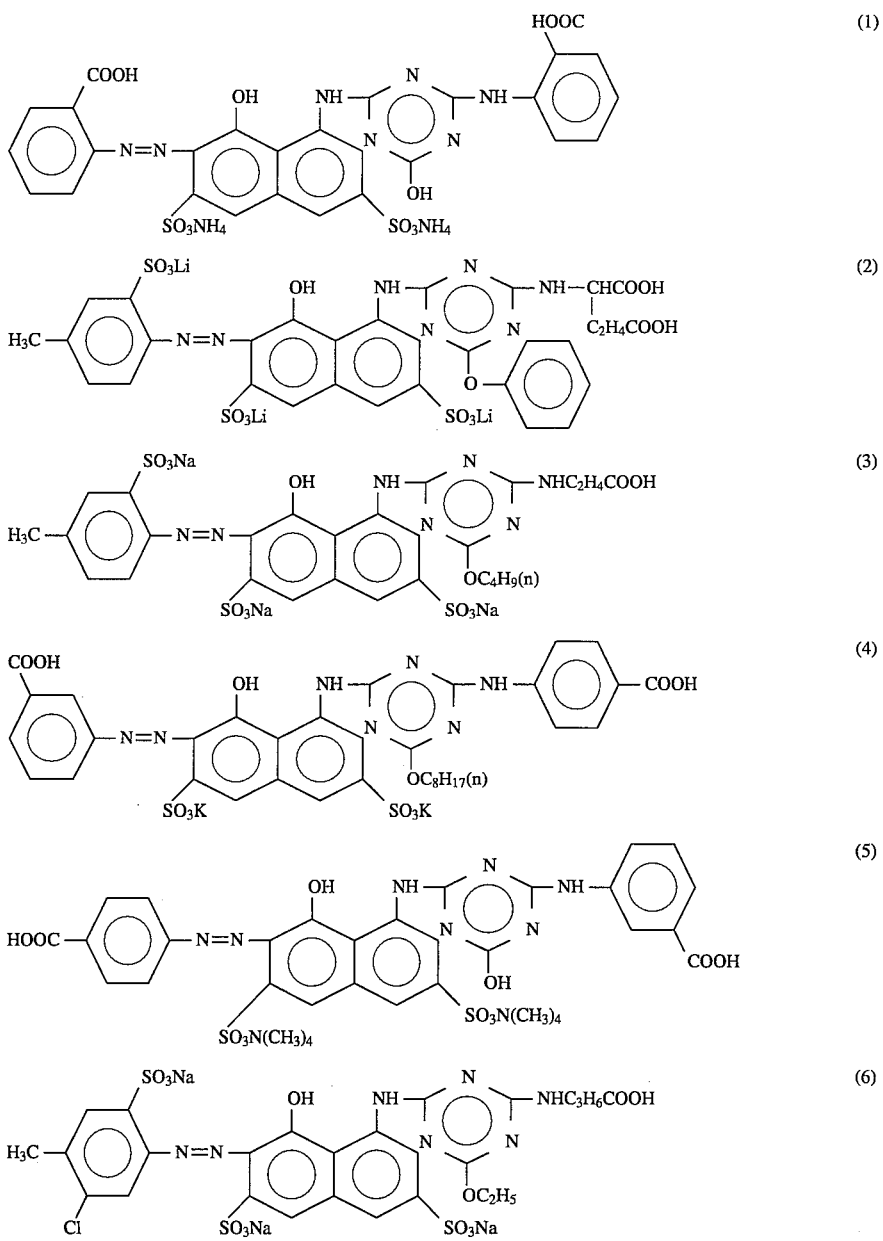

-continued
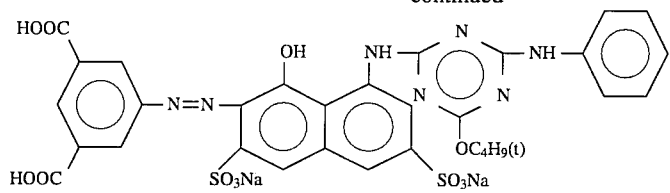
(7)
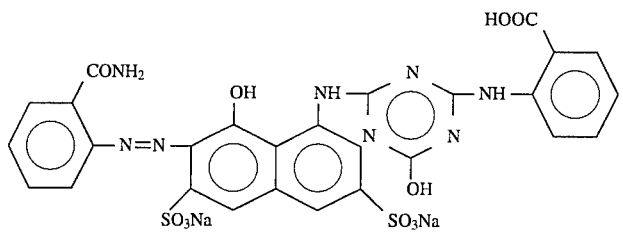
(8)
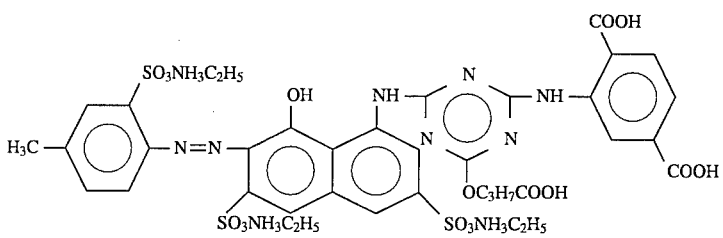
(9)
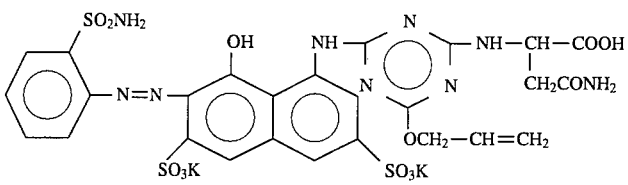
(10)
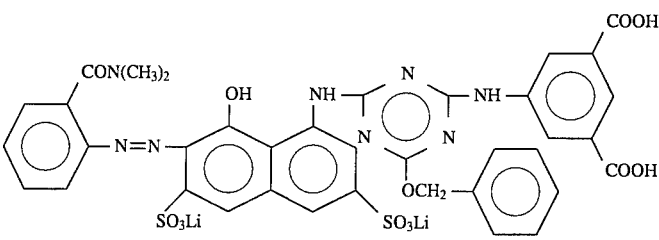
(11)
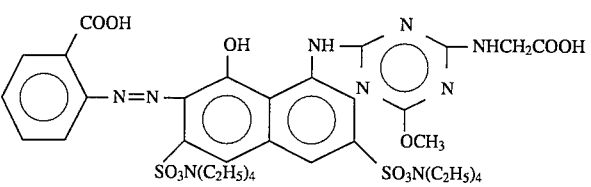
(12)
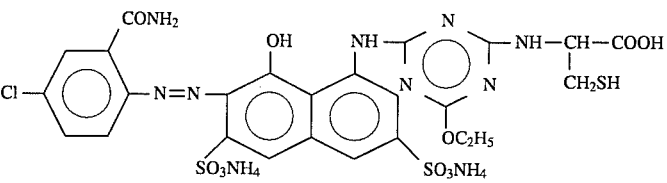
(13)
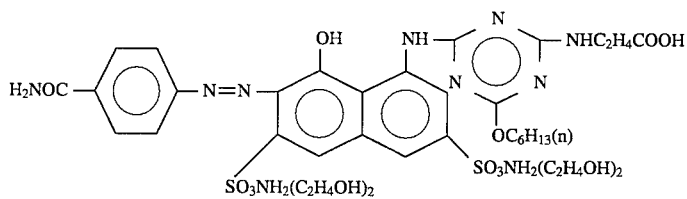
(14)

-continued
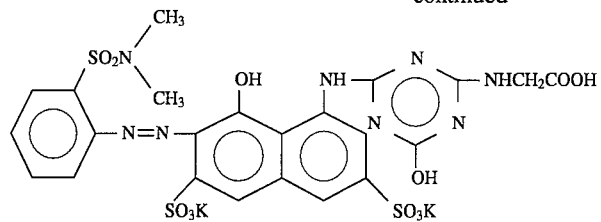
(15)
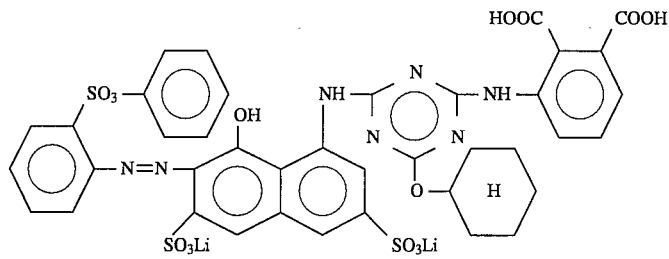
(16)
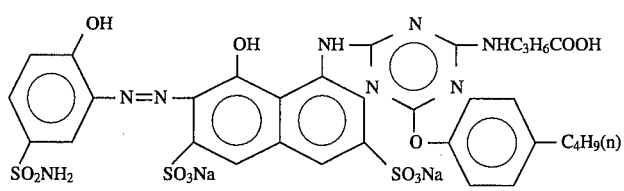
(17)
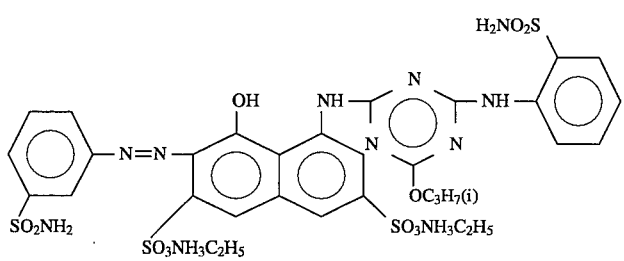
(18)
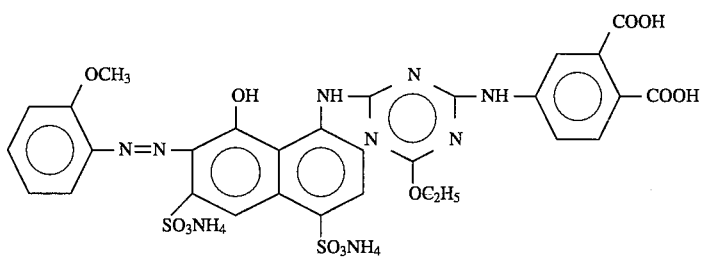
(19)
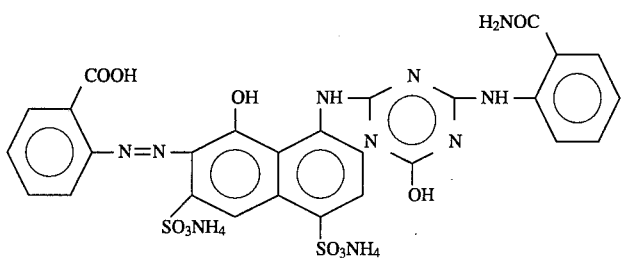
(20)
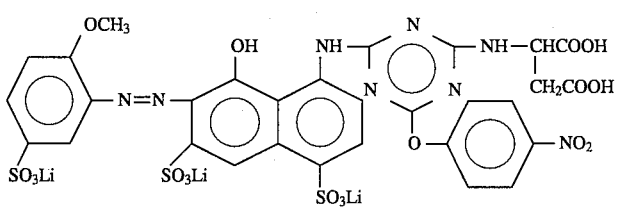
(21)

-continued
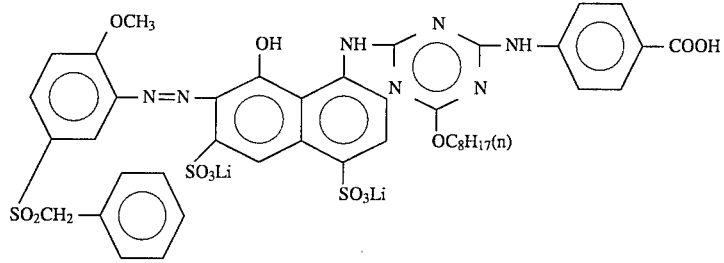
(22)
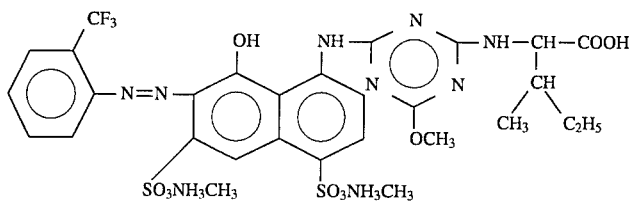
(23)
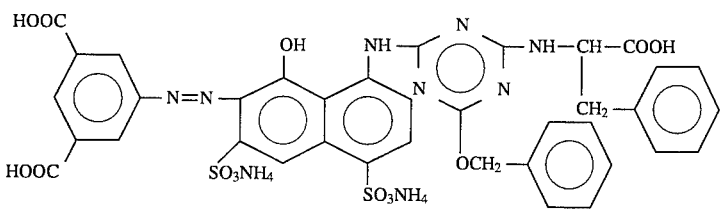
(24)
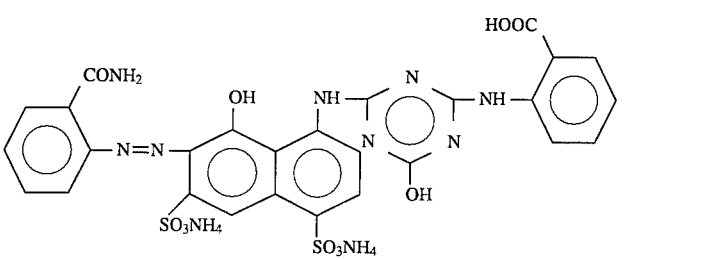
(25)
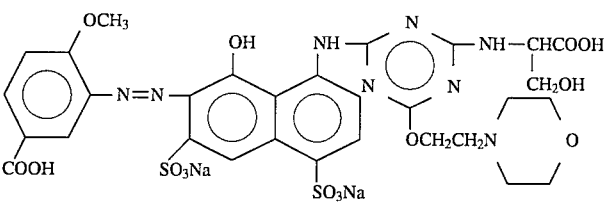
(26)
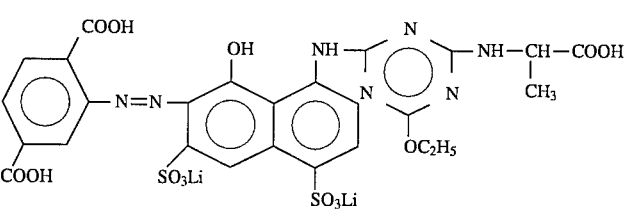
(27)
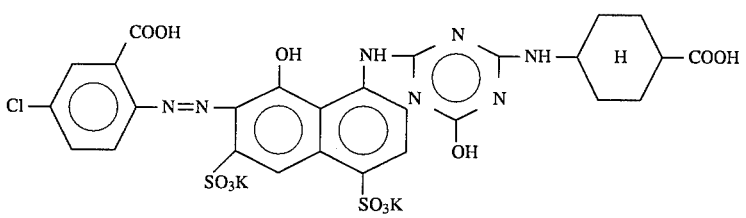
(28)

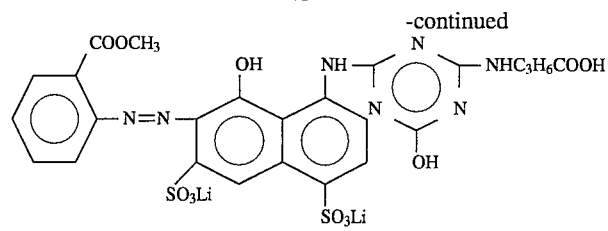
(29)
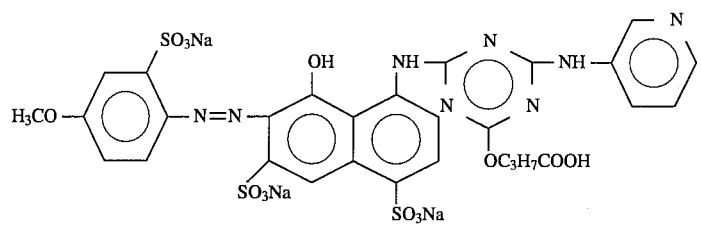
(30)
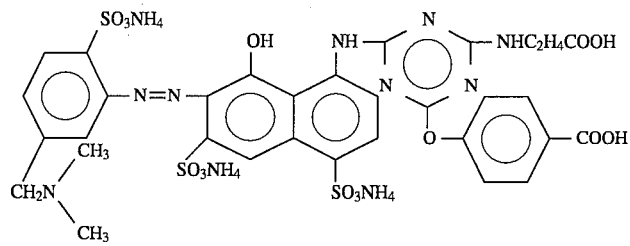
(31)
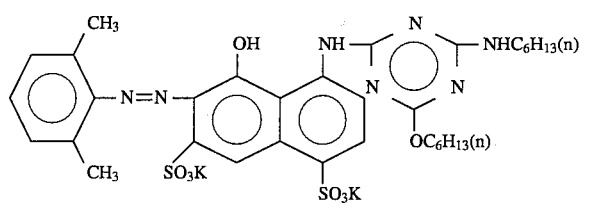
(32)
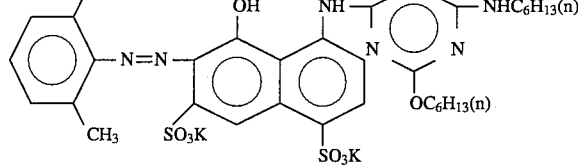
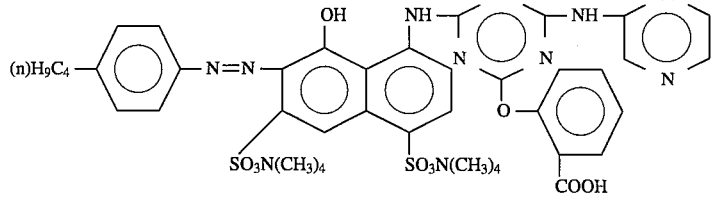
(33)
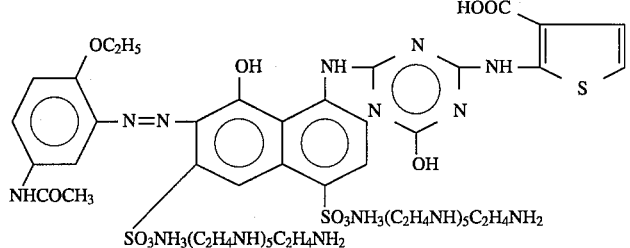
(34)
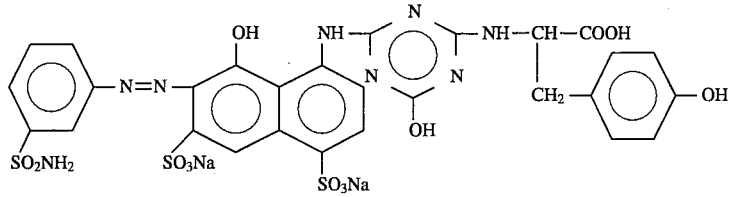
(35)

-continued
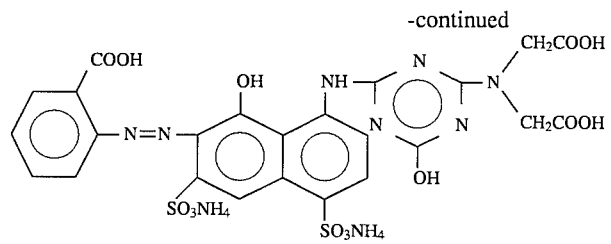
(36)
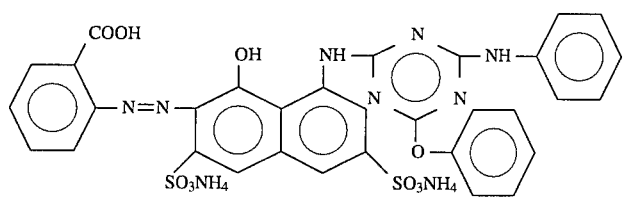
(37)
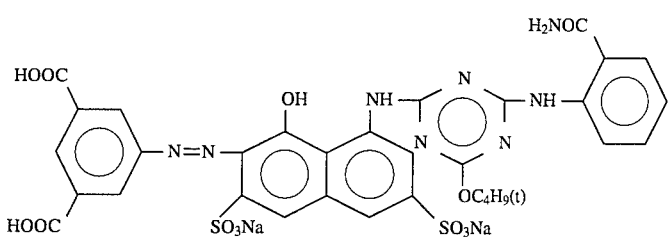
(38)
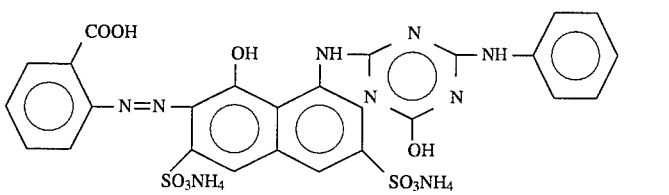
(39)
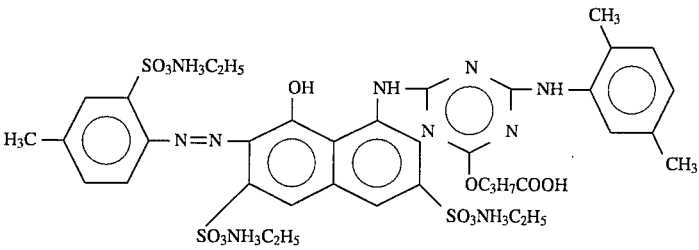
(40)
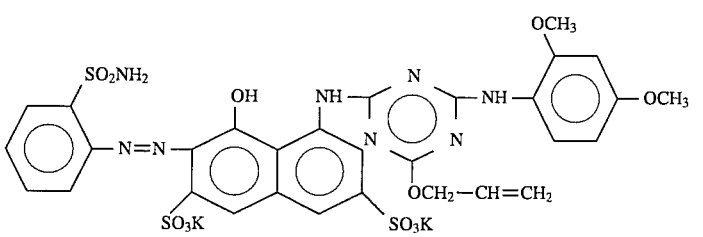
(41)
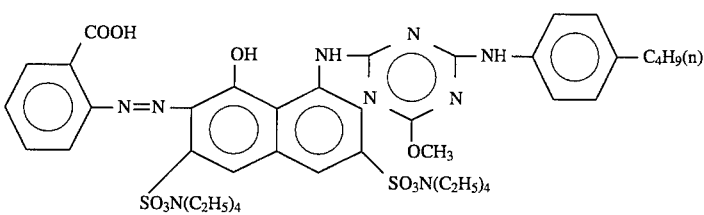
(42)

-continued
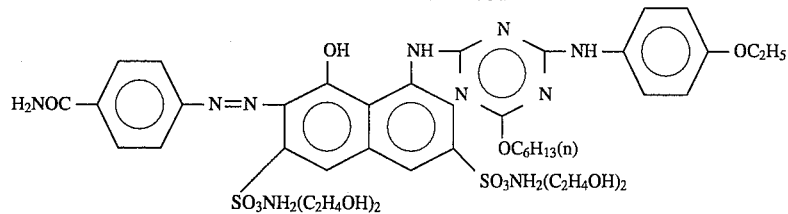
(43)
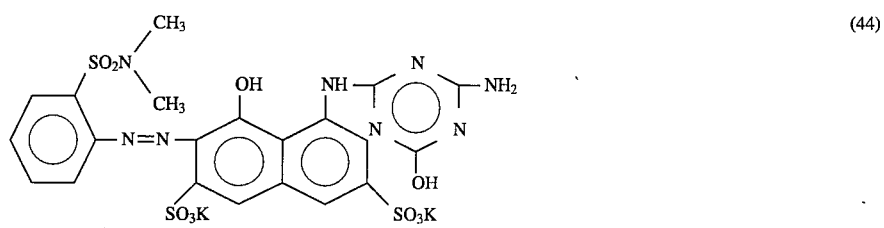
(44)
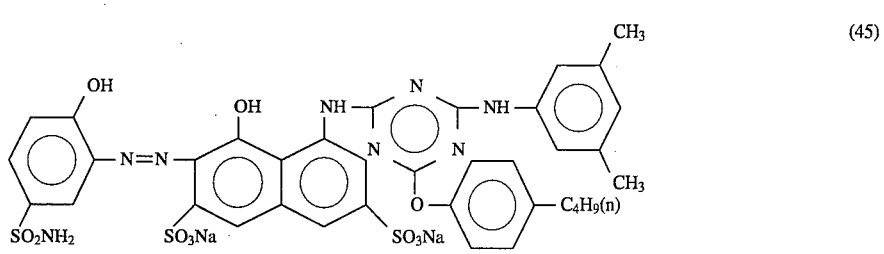
(45)
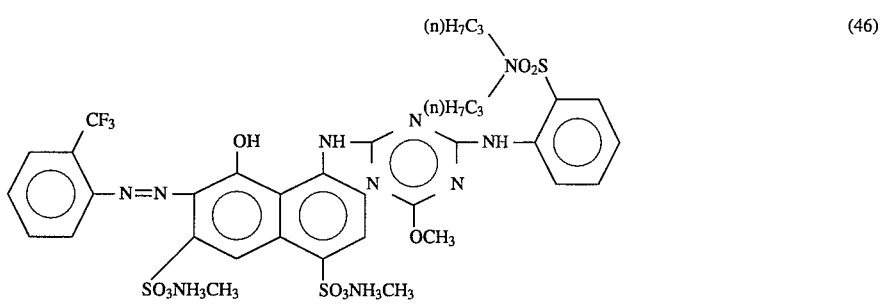
(46)
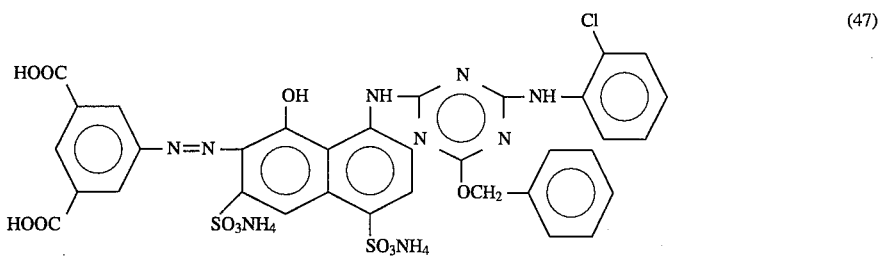
(47)
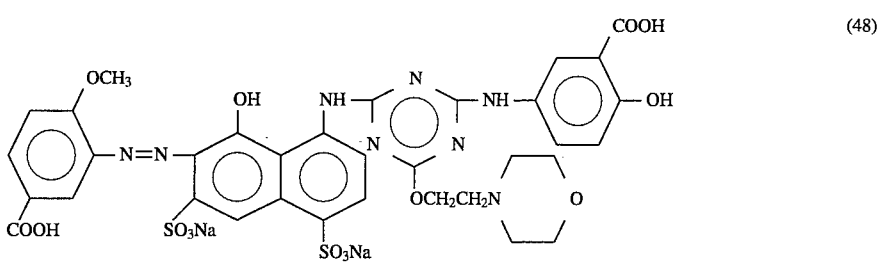
(48)
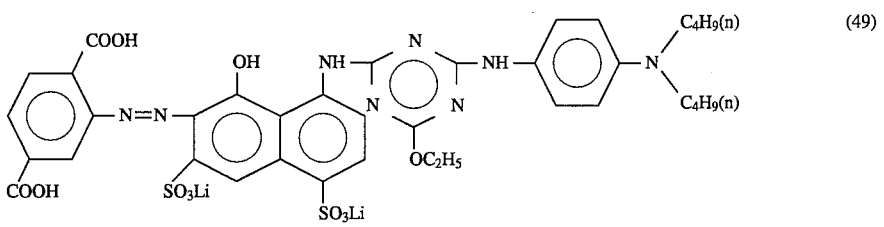
(49)

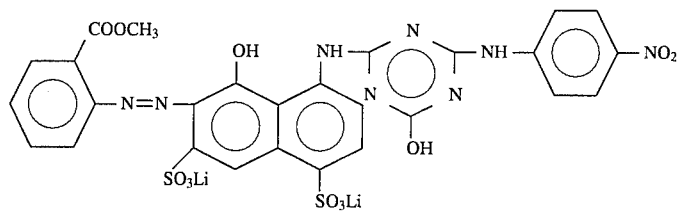

(50)

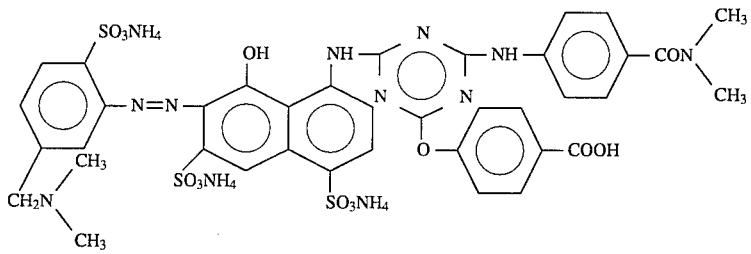

(51)

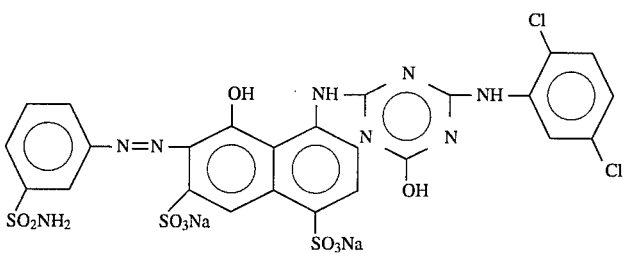

(52)

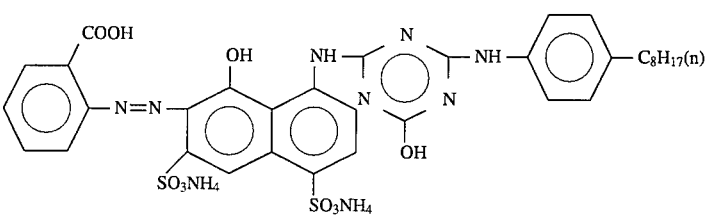

(53)

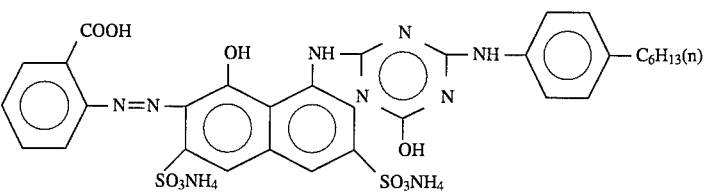

(54)

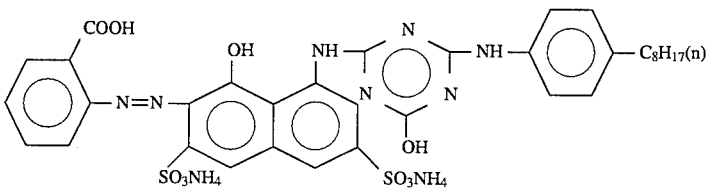

(55)

The azo compounds whose free acid form is represented by the formula {1} can be synthesized by a per se known process. For example, the Compound No. 1 can be produced by the following steps (A) to (C).

(A) From 2-aminobenzoic acid (anthranilic acid) and 1-amino-8-hydroxy-3, 6-naphthalenedisulfonic acid (H-acid), a monoazocompound is produced through the steps of diazotization and coupling according to a conventional method (see, for example, Yutaka Hosoda: "New Dyestuff Chemistry," pp.396 and 409, published by Gihodo Co., Dec. 21, 1973).

(B) The obtained monoazocompound is added to a cyanuric chloride suspension while maintaining pH at 4 to 6 and temperature at 0° to 5° C., and reacted for several hours. This is followed by several hours of condensation reaction at room temperature by adding a 2-aminobenzoic acid (anthranilic acid) aqueous solution so that the reaction mixture won't become alkaline. Then a 25% sodium hydroxide solution is added at 50° to 60° C. to make the reaction mixture strongly alkaline, causing hydrolysis to complete the reaction.

(C) After cooling, the reaction product is salted out with sodium chloride to give the Compound No. 1.

The content of a compound whose free acid form is represented by the formula {1} in the recording liquid is 0.5 to 5% by weight, preferably 2 to 4% by weight, based on the total weight of the recording liquid.

It is preferable that the recording liquid of the present invention contains water and a water-soluble organic solvent as the aqueous medium. Examples of water-soluble organic solvents usable in the present invention are ethylene glycol, propylene glycol, butylene glycol, diethylene glycol, triethylene glycol, polyethylene glycol (weight average molecular weight: 190 to 400), glycerin, N-methylpyrrolidone, N-ethylpyrrolidone, 1,3-dimethylimidazolidinone, thiodiethanol, dimethyl sulfoxide, ethylene glycol monoallyl ether, ethylene glycol monomethyl ether, diethylene glycol monomethyl ether, 2-pyrrolidone, sulforan, ethyl alcohol and isopropanol. The water-soluble organic solvent is usually contained in an amount of 1 to 50% by weight based on the total weight of the recording liquid. On the other hand, water is contained in an amount of 45 to 95% by weight based on the total weight of the recording liquid.

By adding a compound selected from urea, thiourea, biuret and semicarbazide in an amount of 0.1 to 10% by weight, preferably 0.5 to 5% by weight, and/or a surfactant in an amount of 0.001 to 5.0% by weight, based on the total weight of the recording liquid, it is possible to further improve the quick drying characteristics of the liquid after recording and the recorded image quality.

The recording liquid according to the present invention is usable as an ink for ordinary writing instruments such as aqueous ball-point pen, but it is particularly useful as an ink for the ink-jet recording in which fine droplets of the recording liquid are formed by such means as electrical signal, heat energy or electromagnetic waves, and these droplets are ejected from orifices onto a recording medium for forming a recorded image thereon.

The recording liquid of the present invention can be used for the ink-jet recording and for writing with ordinary writing instruments and is capable of forming magenta recorded images with desirable color tone and high density even when recorded on plain paper. This recording liquid is also excellent in image density and in light and water resistance, and has good storage stability.

EXAMPLES

The present invention is described in further detail below with reference to the examples thereof, but the invention is not limited in its scope to these examples.

Synthesis Example

In the conventional manner, diazotization of 2aminobenzoic acid (13.7 g) was conducted by using $NaNO_2$ in the presence of HCl to produce a diazonium salt, and coupling of the diazonium salt with 1-amino-8-hydroxy-3,6-naphthalenedisulfonic acid (31.9 g) was conducted under an alkali condition to obtain a monoazocompound (39.4 g).

The obtained monoazocompound (26.65 g) was added to a cyanuric chloride suspension (9.23 g in 100 ml water) while maintaining pH at 4 to 6 and temperature at 5° C. and reacted for 2 hours. This was followed by 2 hours of condensation reaction at room temperature by adding 2-aminobenzoic acid aqueous solution (10 wt %) so that the reaction mixture would not become alkaline. Then 42 g of a 25 wt % sodium hydroxide aqueous solution was added at 60° C. to make the reaction mixture strongly alkaline, causing hydrolysis to complete the reaction.

After cooling, the reaction product was salted out with sodium chloride to give the compound No. 1 (Yield 22.3 g, Decomposed at about 300° C.).

The compound Nos. 2 to 55 were also obtained by the similar procedure.

Example 1

To a mixture of 10 parts by weight of diethylene glycol, 3 parts by weight of isopropyl alcohol and 3 parts by weight of Compound No. 1 shown in the above, water was added and aqueous ammonia was added to adjust pH to 9, and its total amount was made 100 parts by weight. This composition was mixed well to dissolve the materials, filtered under pressure with a Teflon filter having a pore size of 1 µm and then degassed by a vacuum pump and an ultrasonic cleaner to produce a recording liquid.

The recording liquid thus obtained was subjected to ink-jet recording on paper for electrophotography (produced by Xerox Co., Ltd.) using an ink jet printer (HG-3000 (trade name) manufactured by Epson Co., Ltd.) to obtain a high-density magenta recorded image. The recorded image was evaluated with respect to the following (a) to (d).

(a) Color tone

Color tone of the recorded image was determined by a color difference meter (SZ-Σ80 manufactured by Nippon Denshoku Kogyo KK) The $L^*$, $a^*$ and $b^*$ values were 56 6, 59.2 and 0.9, respectively, and the image had a high-chroma magenta color tone.

(b) Light resistance

Using a xenon fade meter (manufactured by Suga Testing Machinery Co., Ltd.), the recorded paper was irradiated with light from a xenon lamp for 100 hours and the degree of discoloration and fading of the recorded image after irradiation was measured. Both discoloration and fading were small in degree.

(c) Water resistance (1) Testing method

The recorded image was immersed in tap water for 5 minutes and then:

(i) blotting of the image was examined visually; and (ii) OD values of the solid Portion of the image before and after immersion were measured by a Macbeth densitometer (TR 927).

(2) Test results (i) Blotting of the image was slight.

(ii) The change of density of the solid image portion after immersion was represented by OD retention calculated from the following equation:

$$OD \text{ retention} = \frac{OD \text{ value after immersion}}{OD \text{ value before immersion}} \times 100 \ (\%)$$

The OD retention was 78.3%.

(d) Storage stability of recording liquid

The recording liquid was stored for one month at 5° C. and 60° C. in a closed container and change of the liquid was examined. No deposition of insoluble matters was observed.

Example 2

To a mixture of 5 parts by weight of glycerin, 10 parts by weight of ethylene glycol and 2.5 parts by weight of Compound No. 8, water was added and aqueous ammonia was added to adjust pH to 9, and the total amount was made 100 parts by weight. This composition was treated in the same manner as in Example 1 to prepare a recording liquid.

Using this recording liquid, ink-jet recording was carried out according to the same method as in Example 1 to obtain a high-density magenta recorded image. The same evaluations (a) to (d) as in Example 1 were conducted, and the results were all good as in Example 1. The OD retention was 90.6%.

Example 3

To a mixture of 10 parts by weight of diethylene glycol, 5 parts by weight of N-methylpyrrolidone, 3 parts by weight of isopropyl alcohol and 3 parts by weight of Compound No. 23, water was added and aqueous ammonia was added to adjust pH to 9, and the total amount was made 100 parts by weight. The resulting composition was treated in the same manner as in Example 1 to prepare a recording liquid, and ink-jet recording was carried out using this recording liquid according to the same method as in Example 1 to obtain a high-density magenta recorded image. The same evaluations (a) to (d) as in Example 1 were conducted, and the results were all good as in Example 1. The OD retention was 87.8%.

Example 4

To a mixture of 7.5 parts by weight of glycerin, 7.5 parts by weight of 2,2'-thiodiethanol, 7.5 parts by weight of urea, 1 part by weight of diethylene glycol monobutyl ether and 3 parts by weight of Compound No. 39, water was added and aqueous ammonia was added to adjust pH to 9, and the total amount was made 100 parts by weight. This composition was treated in the same manner as in Example 1 to prepare a recording liquid, and ink-jet recording was carried out using this recording liquid according to the method of Example 1 to obtain a high-density magenta recorded image. The same evaluations (a) to (d) as in Example 1 were conducted, and the results were all good as in Example 1.

The L* a* and b* values were 57.0, 61.2 and 1.2, respectively, and the image had a high-chroma magenta color tone. The OD retention was 76.7%

Examples 5–53

According to the same procedure as in Example 1 except for use of Compound Nos. 2, to 7, Nos. 9 to 22, Nos. 24 to 38 and Nos. 40 to 53 in place of Compound No. 1, recording liquids were produced, ink-jet recording was performed using these recording liquids to obtain recorded images, and the evaluations (a) to (d) were conducted. The results were all good as in Example 1. The OD retention was 74.2% when using Compound No. 2, and 81.0% when using Compound No. 3.

Examples 54 and 55

The procedure of Example 1 was followed except for use each of Compound Nos. 54 and 55 in place of No. 1 to produce a recording liquid, and ink-jet recording was carried out using the recording liquid to obtain a recorded image, and the evaluations (a) to (d) were conducted. The results were all good as in Example 1. The OD retention was 81.0% when using Compound No. 54, and 93.9% when using Compound No. 55.

What is claimed is:

1. A recording liquid for a writing instrument or an ink-jet recording comprising an aqueous medium and at least one selected from the compounds whose free acid form is represented by the formula {1}:

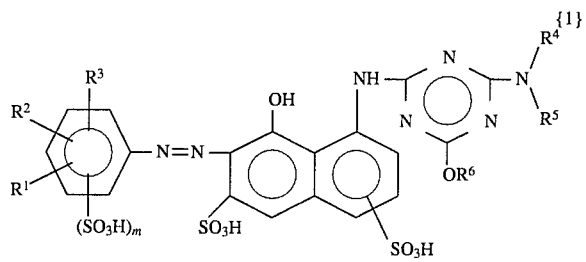

wherein, $R^1$, $R^2$ and $R^3$ each independently represent a substituted or unsubstituted $C_{1-9}$ alkyl group, a $C_{1-9}$ alkoxy group, a halogen, hydrogen, a hydroxyl group, a substituted or unsubstituted carbamoyl group, a substituted or unsubstituted sulfamoyl group, a substituted or unsubstituted amino group, a nitro group, a sulfonic ester group, a $C_{1-9}$ alkyl- or $C_{6-15}$ aryl-sulfonyl group, a COOH group or a carboxylic ester group;

m is a number of 0, 1 or 2; and $R^4$, $R^5$ and $R^6$ each independently represent hydrogen, a $C_{1-18}$ alkyl group, a $C_{2-18}$ alkenyl group, an aryl group, an aralkyl group, an alicyclic group or a heterocyclic group, any of which groups except hydrogen may have a substituent with the proviso that the substituent of $R^6$ is not an amine.

2. A recording liquid for a writing instrument or an ink-jet recording according to claim 1, wherein at least one of $R^4$, $R^5$ and $R^6$ is an alkyl group, an alkenyl group, an aryl group, an aralkyl group or a cyclohexyl group, and these groups are substituted with 1 to 4 COOH groups.

3. A recording liquid for a writing instrument or an ink-jet recording according to claim 2, wherein one of $R^4$ and $R^5$ is hydrogen and the other is an alkyl group, an alkenyl group, an aryl group, an aralkyl group or a cyclohexyl group, and these groups are substituted with 1 to 4 COOH groups.

4. A recording liquid for a writing instrument or an ink-jet recording according to claim 1 wherein m is 1 and the $SO_3H$ group substitutes at the ortho-position with respect to the azo group.

5. A recording liquid for a writing instrument or an ink-jet recording according to claim 1, wherein m is 0, and at least one of $R^1$, $R^2$ and $R^3$ is hydrogen and also at least one of $R^1$, $R^2$ and $R^3$ is a group selected from the group consisting of a trifluoromethyl group, a substituted or unsubstituted carbamoyl group, a substituted or unsubstituted sulfamoyl group, a sulfonic acid lower alkyl ester group, a COOH group and a carboxylic acid lower alkyl ester group, at the ortho-position with respect to the azo group.

6. A recording liquid for a writing instrument or an ink-jet recording according to claim 1, wherein the group represented by the formula:

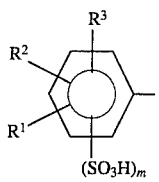

in the formula {1}, is a group represented by the formula:

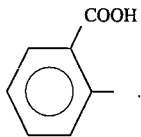

7. A recording liquid for a writing instrument or an ink-jet recording according to claim 1, wherein $R^6$ is hydrogen.

8. A recording liquid for a writing instrument or an ink-jet recording according to claim 1, wherein the $SO_3H$ groups substitute at the 3- and 5-positions or at the 3- and 6-positions of the naphthol ring of the formula (1).

9. A recording liquid for a writing instrument or an ink-jet recording according to claim 8, wherein the $SO_3H$ groups substitute at the 3- and 6-positions of the naphthol ring.

10. A recording liquid for a writing instrument or an ink-jet recording according to claim 1, wherein $R^4$ and $R^5$ each independently represent hydrogen or a group represented by the formula {2}:

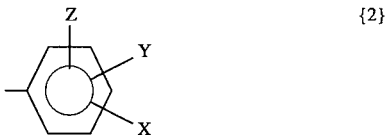

wherein X, Y and Z each independently represent hydrogen, a halogen, a hydroxyl group, a substituted or unsubstituted $C_{1-12}$ alkyl group, a $C_{1-9}$ alkoxy group, a substituted or unsubstituted carbamoyl group, a substituted or unsubstituted sulfamoyl group, a substituted or unsubstituted amino group, a nitro group, a sulfonic ester group or a carboxylic ester group.

11. A recording liquid for a writing instrument or an ink-jet recording according to claim 1, wherein one of $R^4$ and $R^5$ is hydrogen and the other is a group represented by the formula {3}:

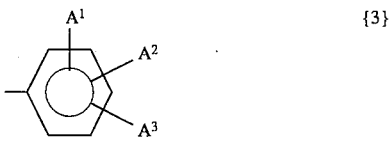

wherein $A^1$, $A^2$ and $A^3$ each independently represent hydrogen; a carboxyl group; a carbamoyl group or a sulfamoyl group, which may be substituted with a $C_{1-4}$ alkyl group; or a $C_{2-5}$ alkoxycarbonyl group; with a proviso that all of $A^1$, $A^2$ and $A^3$ do not represent hydrogen at the same time.

12. A recording for a writing instrument or an ink-jet recording liquid according to claim 11, wherein at least one of $A^1$, $A^2$ and $A^3$ is hydrogen.

13. A recording for a writing instrument or an ink-jet recording liquid according to claim 11, wherein at least one of $A^1$, $A^2$ and $A^3$ is a carboxyl group.

14. A recording liquid for a writing instrument or an ink-jet recording according to claim 1, wherein one of $R^4$ and $R^5$ is hydrogen and the other is a group represented by the formula {4}:

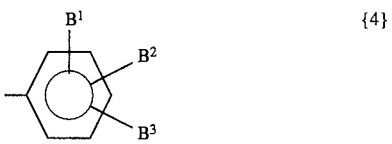

wherein $B^1$, $B^2$ an $B^3$ each independently represent hydrogen; a normal-chain $C_{4-12}$ alkyl group; an amino group, a carbamoyl group, or sulfamoyl group, which is mono- or di-substituted with a $C_{4-9}$ alkyl group; or a $C_{5-9}$ alkoxycarbonyl group; with a proviso that all of $B^1$, $B^2$ and $B^3$ do not represent hydrogen at the same time.

15. A recording liquid for a writing instrument or an ink-jet recording according to claim 14, wherein at least one of $B^1$, $B^2$ and $B^3$ is hydrogen.

16. A recording liquid for a writing instrument or an ink-jet recording according to claim 14, wherein at least one of $B^1$, $B^2$ and $B^3$ is a normal-chain $C_{4-9}$ alkyl group.

17. A recording liquid for a writing instrument or an ink-jet recording according to claim 1, wherein the compound whose free acid form is represented by the formula (1) has not more than 4 of $SO_3H$ and COOH groups, and salt and lower alkyl ester groups thereof, in total.

18. A recording liquid for a writing instrument or an ink-jet recording according to claim 1, wherein the content of the compound whose free acid form is represented by the formula {1} is 0.5 to 5% by weight based on the total weight of the recording liquid.

19. A recording liquid for a writing instrument or an ink-jet recording according to claim 1, wherein the aqueous medium is a mixture of 45 to 95% by weight of water and 1 to 50% by weight of a water-soluble organic solvent, the amounts being based on the total weight of the recording liquid.

20. A recording liquid for a writing instrument or an ink-jet recording according to claim 1, wherein $R^6$ is hydrogen, an unsubstituted $C_{1-18}$ alkyl group having a carboxy group, a substituted or unsubstituted $C_{2-18}$ alkenyl group, a substituted or unsubstituted aryl group, a substituted or unsubstituted aralkyl group, a substituted or unsubstituted alicyclic group, or a substituted or unsubstituted heterocyclic group.

21. An ink-jet recording method in which droplets of a recording liquid are formed and these droplets are ejected from orifices onto a recording medium to form an image thereon, wherein the recording liquid comprises an aqueous medium and at least one selected from the compounds whose free acid form is represented by the formula {1}:

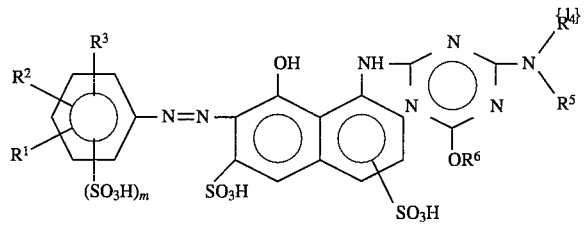

wherein $R^1$, $R^2$ and $R^3$ each independently represent a substituted or unsubstituted $C_{1-9}$ alkyl group, a $C_{1-9}$ alkoxy group, a halogen, hydrogen, a hydroxyl group, a substituted or unsubstituted carbamoyl group, a substituted or unsubstituted sulfamoyl group, a substituted or unsubstituted amino group, a nitro group, a sulfonic ester group, a $C_{1-9}$ alkyl- or $C_{6-15}$ aryl-sulfonyl group, a COOH group or a carboxylic ester group;

m is a number of 0, 1 or 2; and $R^4$, $R^5$ and $R^6$ each independently represent hydrogen, a $C_{1-18}$ alkyl group, a $C_{2-18}$ alkenyl group, an aryl group, an aralkyl group an alicyclic group or a heterocyclic group. any of which groups except hydrogen may have a substituent.

* * * * *